June 22, 1954     R. B. CHAMBERS     2,681,713
ROTARY FLUID BRAKE

Filed Sept. 7, 1951     3 Sheets-Sheet 1

INVENTOR
ROBERT B. CHAMBERS,

BY
McMorrow, Berman & Davidson
ATTORNEYS

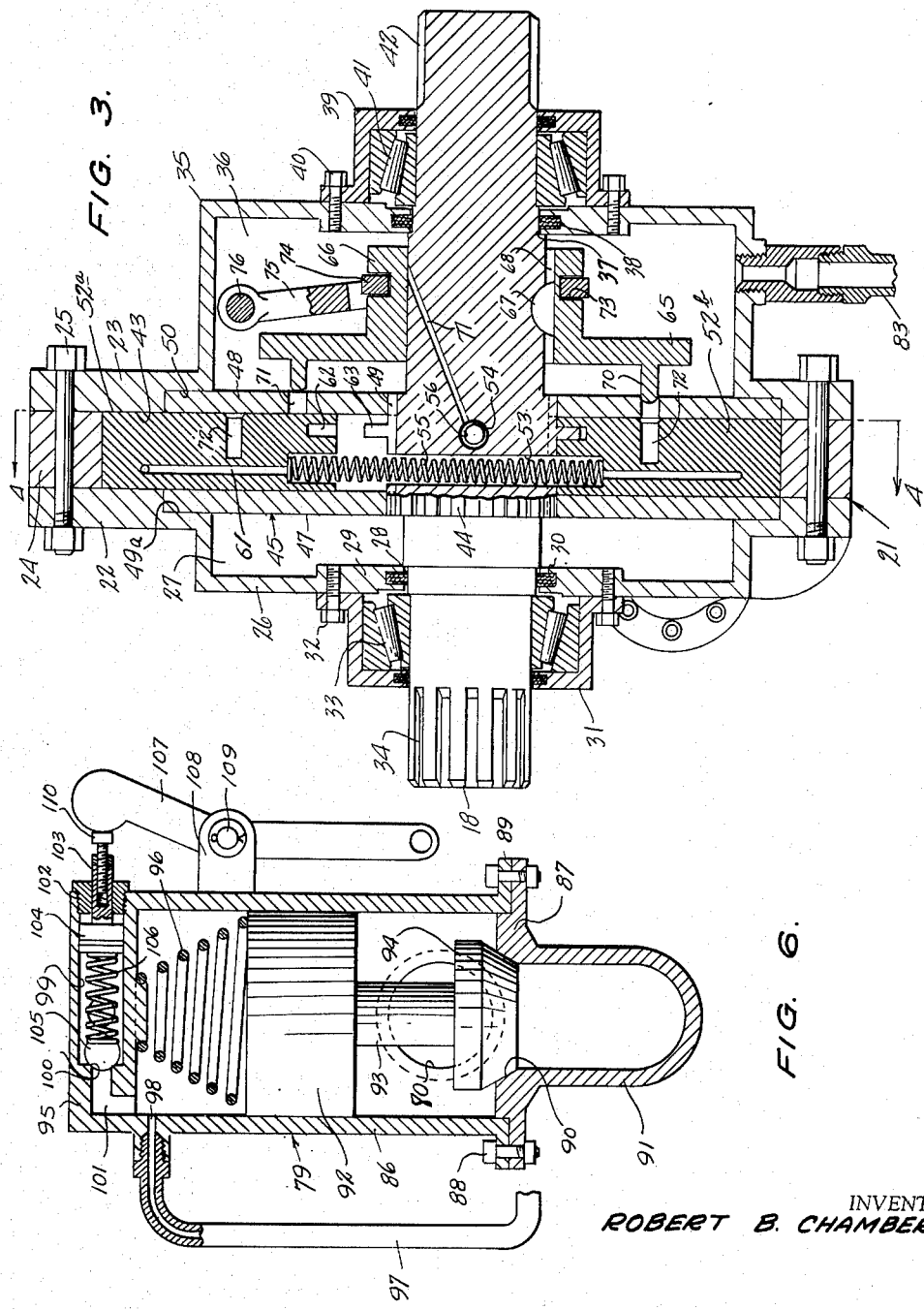

June 22, 1954  R. B. CHAMBERS  2,681,713
ROTARY FLUID BRAKE
Filed Sept. 7, 1951  3 Sheets-Sheet 3
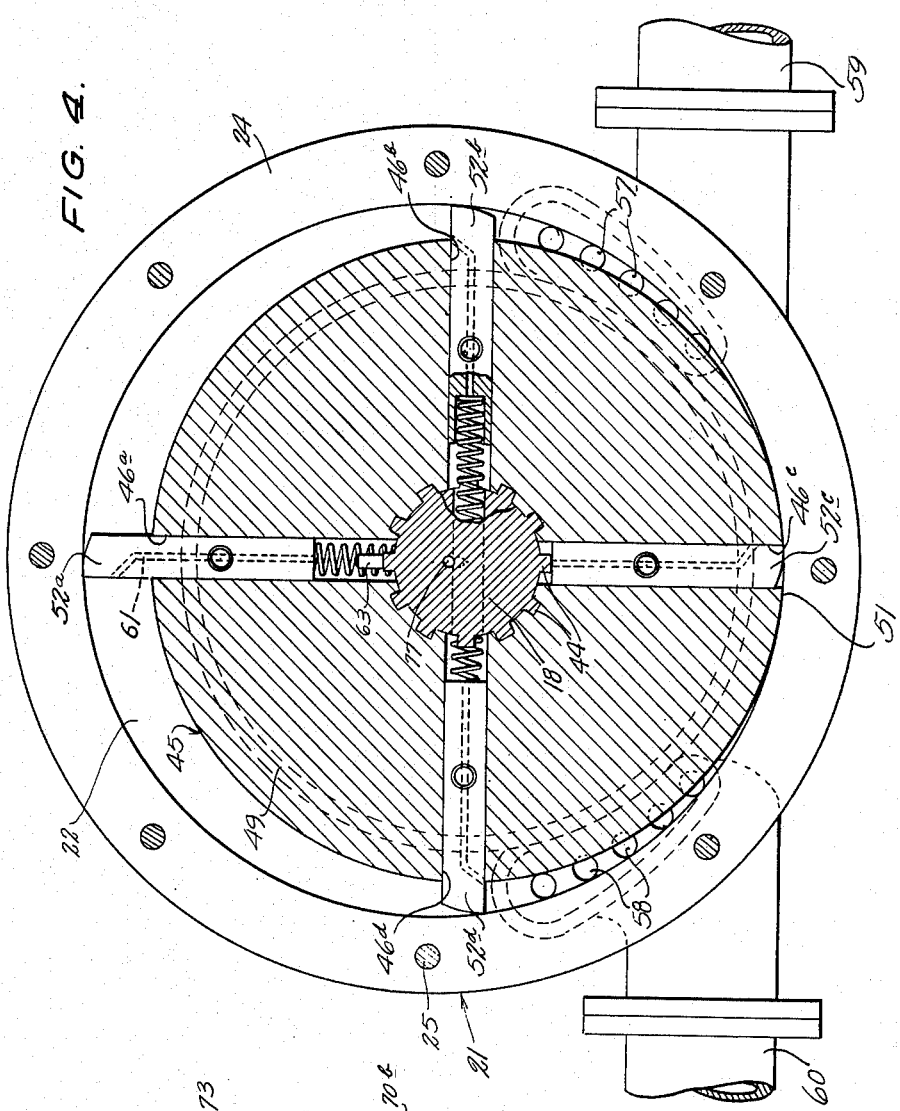
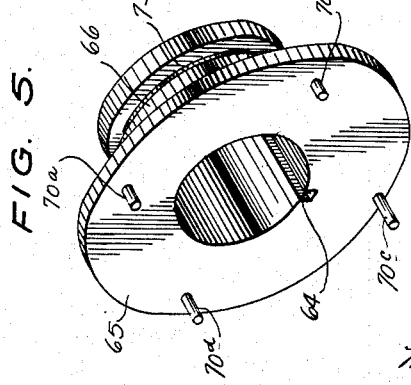
INVENTOR
ROBERT B. CHAMBERS,
BY
McMorrow, Berman + Davidson
ATTORNEYS Patented June 22, 1954

2,681,713

UNITED STATES PATENT OFFICE 2,681,713

ROTARY FLUID BRAKE

Robert B. Chambers, Lander, Wyo.

Application September 7, 1951, Serial No. 245,590

1 Claim. (Cl. 188—90)

This invention relates to rotary fluid brakes and more particularly to a hydraulic pump type brake to be installed on burden vehicles in addition to the usual wheel brakes to provide braking action on long downgrades and relieve the wheel brakes of excessive wear and overheating.

It is among the objects of the invention to provide an improved hydraulic pump or torque brake which can be mounted on a vehicle and connected directly to the vehicle drive shaft to assist the vehicle engine in reducing the speed or preventing undesirable increase in the speed of the vehicle over long intervals of braking action, as when the vehicle is travelling by gravity along a long downgrade or its speed is being gradually reduced from a very high operating speed; which utilizes fluid friction exclusively to provide the braking action and provides means for rapidly removing the friction generated heat from the operating fluid; which provides a reserve supply of liquid to insure the availability of ample quantities of liquid for its braking operation; which returns substantially all used liquid to the reserve supply and is not subject to material leakage; which maintains the operating pressure of the working fluid below a predetermined value at all times to avoid locking of the vehicle drive mechanism or damage to the brake parts; which provides a sensitive control of the braking action by the driver of the vehicle; and which is simple and durable in construction, economical to manufacture and install, and positive and effective in operation.

Other objects and advantages will become apparent from a consideration of the following description and the appended claims in conjunction with the accompanying drawings wherein:

Figure 3 is a cross sectional view on a further enlarged scale on the line 3—3 of Figure 2;

Figure 4 is a cross sectional view on the line 4—4 of Figure 3;

Figure 5 is a perspective view of a clutch disc constituting an operative component of the brake; and Figure 6 is a cross sectional view on an enlarged scale on the line 6—6 of Figure 2.

Figure 1:
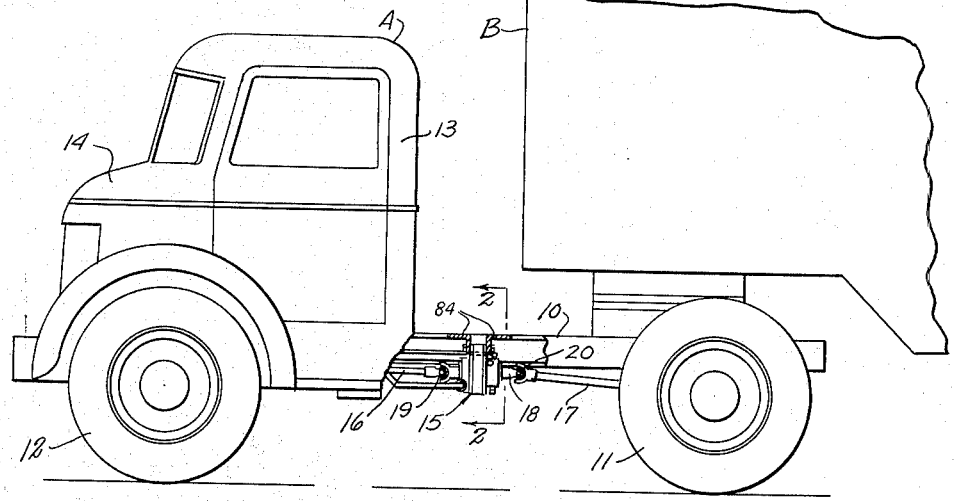
Figure 1 is a side elevational view of an automotive vehicle, a portion being broken away and shown in cross section to illustrate the application of a hydraulic torque brake illustrative of the invention thereto.
Figure 2:
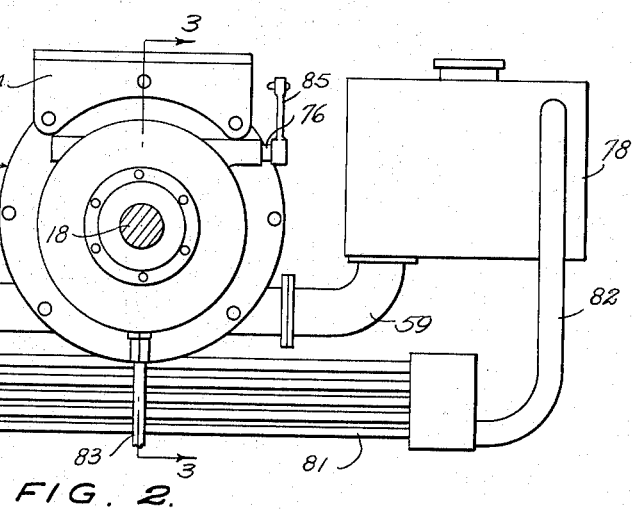
Figure 2 is a cross sectional view on an enlarged scale on the line 2—2 of Figure 1.

With continued reference to the drawings, the vehicle illustrated by way of example in Figure 1 is a semitrailer type of burden vehicle including a tractor unit A and a semitrailer unit B connected at its front end to the rear end of the tractor unit and propelled by the latter.

The tractor unit includes a frame 10 supported by rear drive wheels 11 and front steering wheels 12 and carrying a cab 13 and hood 14 enclosing the usual engine, not illustrated. The brake, generally indicated at 15, is suspended from the frame 10 between the cab and the rear drive wheels 11 and a drive shaft 16 connects the engine, through the usual change speed transmission, to the front end of the brake 15, while a drive shaft 17 connects the rear end of the brake to the rear drive wheels 11 through the usual differential and drive axle mechanism, not illustrated.

With this arrangement, the brake shaft 18 constitutes a torque coupling between the front drive shaft 16 and the rear drive shaft 17 and is driven at all times that the vehicle is in motion. It is connected to the drive shafts 16 and 17 by suitable universal joint connections 19 and 20, respectively.

The brake, itself, comprises a vane type hydraulic pump and includes an annular housing 21 having end plates 22 and 23 of generally circular shape disposed in face to face relationship and held in spaced apart and substantially parallel relationship to each other by a circular ring 24 disposed between the outer circumferential portions of the end plates. Suitable means, such as the bolts 25 extending through the end plates at angularly spaced apart locations around the outer edges of these plates and through the annular ring 24 secure the end plates and the ring together in operative assembly.

The front end plate 22 is provided with a concentrically disposed outward projection 26 of circular shape providing a fluid receiving chamber 27 therein. The wall of the projection 26 is provided with a central aperture 28 surrounded by a circular boss 29 which is grooved around the aperture to receive an annular grease seal 30 and the shaft 18 extends at its front end through the aperture 28 in the front end wall of the housing. A bearing receptacle 31 is secured to the end wall 22 surrounding the opening 28 by suitable means, such as the cap screws or bolts 32, and an antifriction roller bearing 33 is mounted in the receptacle 31 and journals the shaft 18 relative to the front end wall of the housing. At its front end the shaft 18 is provided with a splined portion 34 which provides a driving connection between the front end of the shaft and the front universal joint 19, illustrated in Figure 1.

The rear end wall 23 of the housing is provided with an outwardly projecting, concentric offset 35 of circular shape providing therein a clutch chamber 36 having a thickness longitudinally of the shaft 18 materially greater than the thickness of the drainage chamber 27. The end wall of the projection 35 on the rear end wall 23 of the housing is provided with a central aperture 37 through which the shaft 18 extends and which is circumferentially grooved to receive a grease seal 38 surrounding the shaft. A bearing receptacle 39 is secured on the rear end wall 23 by suitable means, such as the cap screws or bolts 40, and receives an antifriction roller bearing 41 which journals the shaft 18 in the rear end wall of the housing. At its rear end the shaft is provided with a splined portion 42 which provides a driving connection between the shaft and the rear universal joint 20, illustrated in Figure 1.

The shaft 18 is provided within the pump chamber 43 with a splined portion 44 and a rotor, generally indicated at 45, is disposed within the pump chamber and mounted on the splined portion 44 of the shaft.

The rotor is of cylindrical shape and has radially disposed slots, as indicated at 46a, 46b, 46c and 46d in Figure 4, extending from the surface of the shaft 18 to the peripheral surface of the rotor.

The slots have a width less than the width of the rotor and the rotor may be conveniently constructed by providing two circular discs 47 and 48 disposed in spaced apart and substantially parallel relationship, and a filler body 49 of circular shape disposed between the discs and in which the slots 46 are provided. The discs and the filler body may be secured together by suitable means, such as rivets extending through registering apertures in the two discs and the filler body. The rotor may also be provided as a solid body having a central aperture and vane slots provided therein by a suitable operation, such as broaching.

The end wall 22 of the housing is provided around the inner circumference of the offset 26 with an annular internal recess 49a in which the plate or portion 47 of the rotor is marginally received and the rear end wall 23 is provided around the inner circumference of the offset 35 with an internal annular recess 50 in which the disc or portion 48 of the rotor is marginally received, as particularly illustrated in Figure 3.

The shaft 18 and the rotor 45 are journaled in the housing 21 eccentrically of the cylindrical pump chamber 43 and the rotor contacts the peripheral surface of the pump chamber at one location around the surface of the chamber, as indicated at 51 in Figure 4.

Vanes 52 of rectangular cross sectional shape and respectively designated at 52a, 52b, 52c and 52d in Figure 4, are slidably mounted in the slots 46a, 46b, 46c, and 46d, respectively, and are longitudinally movable in the slots to maintain their outer ends in contact with the peripheral surface of the pump chamber as constituted by the inner surface of the ring 24.

Openings 53 and 54 extend diametrically of the splined portion 44 of the shaft 18 substantially perpendicular to each other and at locations spaced apart longitudinally of the shaft and coil compression springs 55 and 56 are respectively disposed in these openings and are received at their ends in socket recesses provided in the inner ends of the corresponding vanes. These springs resiliently urge the vanes outwardly of the corresponding slots to bring the outer ends of the vanes into bearing contact with the inner surface of the ring 24 which constitutes the circumferential wall of the cylindrical pump chamber.

Fluid inlet passages 57 are provided in the end wall 22 of the housing at one side of the location 51 at which the rotor contacts the inner surface of the ring 24, and fluid outlet passages 58 are disposed in the end wall 23 at the opposite side of the location at which the rotor contacts the circumferential wall of the pump chamber.

A fluid inlet conduit 59 is connected at one end to the inlet passages 57 and a fluid outlet conduit 60 is connected at one end to the fluid outlet passages 58.

The mechanism so far described constitutes a vane type liquid pump which will pump fluid from the inlet conduit 59 into the pump and out of the pump through the outlet conduit 60.

Each vane is provided with a fluid passage 61 which leads from the pressure side of the vane near the outer end thereof into the spring receiving recess in the inner end of the vane for admitting fluid under pressure into the vane receiving slots between the inner ends of these slots and the inner ends of the corresponding vanes. This fluid under pressure in the inner ends of the slots assist the springs 55 and 56 in resiliently urging the vanes outwardly of the rotor slots, this effort being additionally assisted by the action of centrifugal force on the vanes when the rotor turns. Each vane is provided in its inner end with a second recess 62 and radial pins or projections 63 are provided on the splined portion 44 of the shaft in position to extend respectively into the recesses 62 in the several vanes when the vanes are forced inwardly of the rotor as they approach the location 51 at which the rotor peripherally contacts the inner annular surface of the pump chamber. Liquid in the inner ends of the vane receiving slots is trapped in the recesses 62 as the pins 63 are forced into these recesses and provides a cushioning effect for inward movements of the vanes, so that the vanes do not strike the shaft 18 or the inner ends of the slots with sufficient force to produce noise and vibration.

The outer ends of the passages 61 are disposed inwardly of the outer ends of the vanes a distance such that the outer ends of the passages are masked in the vane slots in the rotor as the vanes pass the inlet ports 57 and loss of fluid pressure through these passages is thus avoided.

From an inspection of Figure 4, it will be observed that as the rotor 45 turns in the housing 21, the vanes constantly slide in and out in the corresponding slots in the rotor, being at their inner limiting positions with their outer ends substantially flush with the peripheral surface of the rotor when they are at the location 51 at which the rotor peripherally contacts the circumferential surface of the pump chamber and being at their outer limiting position when they are at a position diametrically opposite the position 51 in the pump chamber.

A clutch disc 65 is disposed in the clutch chamber 36 and has a cylindrical hub 66 slidably mounted on the shaft 18, but drivingly connected to the shaft by suitable means, such as the key 67 secured in the shaft and the keyway 68 provided in the hub and slidably receiving the key. This clutch disc carries pins 70, individually designated at 70a, 70b, 70c, and 70d in Figure 5, which extend from the clutch disc toward the rotor 45 at angularly spaced apart locations corresponding to the angular spacing of the vanes 52. The plate 48 is provided with apertures 71 disposed one in alignment with each pin 70 and each vane is provided with a recess 72 opening to the edge thereof adjacent the clutch chamber, and of a size to receive the pins 70.

The pins 70 are of different lengths, successively decreasing in length in one direction of rotation around the associated clutch disc and the apertures 71, recesses 72 and pins 70 are radially spaced from the axis of rotation of the shaft 18, so that as each vane reaches the location 51 its recess registers with the aperture 71 in the rotor plate 48 and with a pin 70 on the clutch disc 65. The clutch hub 66 is provided with an angular groove 73 receiving a split fork 74 and a manually operated lever 75 is pivotally mounted in the annular wall of the offset 36 by a shaft 76 and is pivotally connected to the fork 74 for moving the clutch disc 65 toward and away from the rotor 45.

When the clutch disc is manually moved toward the rotor, the pins 70 are successively received in the recesses 72 in the vanes as the vanes are brought to their inner limiting positions at the location 51 and the pins then lock the vanes in their inner positions and out of contact with the peripheral surface of the pump chamber except at the one location 51.

This operation completely disables the pump and the rotor 45 with its locked vanes will now rotate freely in the pump chamber and produce no retarding effect on the rotation of the shaft 18.

Fluid passages, as indicated at 77, lead from the openings 53 and 54 in the shaft to the surface of the shaft at a location at which their ends remote from the openings 53 and 54 are closed by the hub 66 of the clutch disc when the clutch disc is in position to maintain the pins 70 out of engagement with the vanes 52, as illustrated in Figure 3, and are uncovered when the clutch disc is moved to engage the pins in the vane recesses, so that the pressure of the hydraulic fluid in the inner ends of the slots is relieved and does not operate to urge the vanes outwardly of the rotor when they are locked in their inner limiting positions by the pins on the clutch disc.

A tank 78 constituting a liquid reservoir is mounted at a convenient location on the vehicle and is connected at its bottom to the end of the inlet conduit 59 remote from the brake housing 21 to supply liquid to the inlet side of the pump.

A manually controlled, fluid pressure operated relief valve, generally indicated at 79, is connected at its inlet to the end of the outlet conduit 60 remote from the housing 21, and the outlet of this valve is connected by a conduit 80 to the inlet end of a heat exchanger 81, the outlet end of which is connected to the tank 78 by a conduit 82.

With this arrangement, when the pump is operating, fluid is pumped from the reservoir 78 through the pump and the relief valve 79 and from the relief valve through the conduit 80, the heat exchanger 81 and the conduit 82 back into the reservoir, so that the liquid moves in a closed cycle, the friction generated heat in the liquid being removed as the liquid passes through the heat exchanger 81.

A conduit 83 is connected at one end to the interior of the clutch chamber 36 and at its other end to the reservoir 78 to conduct any liquid draining into the clutch chamber around the rotor or through the apertures 71 or channels 77 back to the reservoir 78, and a similar conduit may be connected from the chamber 27 back to the reservoir, if desired.

A bracket 84 is secured to the housing 21 at the upper side of the housing and to the frame 10 of the vehicle, to rigidly support the brake mechanism on the vehicle frame, and a lever 85 is connected at one end to one end of the shaft 76 to provide means for manually imparting movement to the fork lever 75 to move the clutch pins into and out of engagement with the pump vanes.

The relief valve 79, as is particularly illustrated in Figure 6, comprises a cylindrical valve body 86 secured at one end to an end wall 87 by suitable means, such as the bolts 88 extending through registering apertures in a flange 89 at the corresponding end of the valve body and in the marginal portion of the end wall 87. The end wall 87 is provided with a centrally disposed opening surrounded by a beveled valve seat 90 and an elbow fitting 91 is joined at one end to the end wall 87 surrounding the annular valve seat 90 and is joined at its other end to the pump outlet conduit 60.

A piston 92 is slidably mounted in the valve body 86 and a stem 93 extends from this piston toward the valve seat 90 and carries a beveled valve head 94 on its end remote from the piston. The valve head 94 cooperates with the valve seat 90 to control the passage of liquid from the pump outlet conduit 60 through the relief valve to the exhaust conduit 80 of the valve.

At its end remote from the end wall 87 the valve body 86 is provided with a thick end wall 95 and a coiled compression spring 96 is disposed in the valve body between the end wall 95 and the adjacent end of the piston 92 to resiliently urge the valve head 94 toward the valve seat 90.

A bypass conduit 97 leads from the pump outlet conduit 60 to the interior of the valve body 86 at a location between the piston 92 and the end wall 95, this conduit leading into the valve chamber within the valve body through a restricted orifice 98 in the wall of the valve body.

A control valve chamber 99 is provided in the end wall 95 and is of cylindrical shape opening at one end to the circumferential surface of the end wall and having a valve seat 100 at its other end connected by a fluid passage 101 with the interior of the valve body 86 at the inner side of the end wall 95.

A screw plug 102 is threaded into the outer end of the valve chamber 99 and has a central aperture extending therethrough and a stem 103 extends slidably through the aperture in the screw plug and carries a piston 104 on its end within the valve chamber 99.

A valve ball 105 is disposed adjacent the valve seat 100 and a compression spring 106 is interposed between the valve ball 105 and the piston 104.

A manually operated lever 107 is pivotally mounted intermediate its length on the valve body 86 by an apertured lug 108 and a pivot pin 109 extending through registering apertures in the lever and the lug and this lever has one end disposed opposite the outer end of the stem 103. The stem 103 is provided with a screw threaded bore and a screw 110 is threaded into this bore and bears at its outer end against the adjacent end of the lever 107 to provide an adjustable connection between the lever and the valve stem.

Suitable means, such as a flexible push and pull device, not illustrated, is connected to the other end of the lever 107, so that the spring 106 can be manually loaded to various selected degrees to vary the spring strength tending to seat the valve ball 105.

An exhaust bypass conduit 111 leads from the valve chamber 99 to the vent or exhaust conduit 80 of the valve 79 to vent fluid passing the valve ball 105 from the valve chamber 99.

With this arrangement, fluid under pressure from the pump flows through the bypass conduit 97 from the pump outlet conduit 60 into the relief valve body 86 between the piston 92 and the end wall 95 and forces the valve head 94 toward the seat 90, thus restricting the outlet of the pump brake and causing the pump to absorb energy from the drive shaft of the vehicle, retarding the rotation of the drive shaft and the forward motion of the vehicle. The pressure of the fluid in the valve body between the piston 92 and the end wall 95 of the valve body is controlled by the pressure of the spring 106 on the valve ball 105 and is varied by the manually operated lever 107, so that the driver of the vehicle can regulate the amount of energy which the hydraulic torque brake absorbs from the vehicle drive shaft and converts into heat through fluid friction. The compression of the spring 106 by the lever 107 is limited, however, so that the valve ball 105 can always move off of its seat when a predetermined fluid pressure in the passage 101 exists, thereby insuring that the fluid pressure in the brake and the relief valve will not, at any time, exceed the mechanical strength of the parts and cause damage to the mechanism.

With this arrangement, when the vanes are locked in their inner limiting positions by the pins on the clutch disc, the rotor with its included vanes rotates freely in the housing and no pumping or braking action is produced. When the vanes are released, the rotor and vanes pump liquid from the inlet conduit to the outlet conduit through the relief valve and the outlet pressure of the liquid is controlled by the manually operated control valve actuated by the lever 107, so that the driver has a sensitive control over the braking action of the hydraulic torque brake. As the heat generated in the liquid by the braking action is removed by the heat exchanger 81, the brake can operate for an indefinite period without overheating and, since all of the braking is done by fluid friction, there is no material wear of the parts.

It is contemplated that the vehicle will be equipped with the usual wheel brake for stopping and for short period braking operations and that the hydraulic torque brake of the present invention will be used mainly for long period braking operations which would cause excessive wear and overheating of the usual wheel brake.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A liquid brake assembly comprising a housing having a cylindrical pump chamber therein and a clutch chamber disposed to one side of said pump chamber, a shaft journalled in said housing and extending through said clutch chamber and said pump chamber eccentrically of the latter, a rotor of cylindrical shape concentrically mounted on said shaft within said pump chamber and contacting the peripheral surface of said pump chamber at one location therearound, said rotor having radially disposed slots extending to the periphery thereof at substantially equal angular intervals therearound and said housing having fluid inlet and outlet passages therein disposed at the respectively opposite sides of the location of contact between said pump chamber and said rotor, vanes slidably mounted one in each of said slots, springs in said rotor engaging the inner ends of said vanes and urging the outer ends thereof into contact with the peripheral surface of said pump chamber and together with said rotor constituting a fluid pump, each of said vanes having a recess in the edge thereof adjacent said clutch chamber and said rotor having apertures in the portion thereof adjacent said clutch chamber which apertures register respectively with the recesses in said vanes when the vanes are at their inner limiting positions relative to said rotor, a clutch disc slidably mounted on said shaft within said clutch chamber and drivingly connected to the shaft, pins on said clutch disc extending through the apertures in said rotor and into the recesses in said vanes when said clutch disc is moved toward said pump chamber to hold said vanes in their inner limiting positions and thereby disable said pump, manually operated means connected to said clutch disc for moving said pins into and out of engagement with said vanes, said vanes having fluid passages therein admitting fluid under pressure from the outlet side of said pump into said slots at the inner ends of said vanes to assist said springs in urging said vanes outwardly of said rotor and said shaft having fluid passages therein leading from the inner ends of said slots to the exterior of said shaft at a location at which they are closed by said clutch disc when the latter is in vane releasing position and opened when the clutch disc is in vane engaging position.

References Cited in the file of this patent

UNITED STATES PATENTS

| Number | Name | Date |
|---|---|---|
| 721,303 | Hoff | Feb. 24, 1903 |
| 1,156,819 | Rich | Oct. 12, 1915 |
| 1,501,451 | Hoover | July 15, 1924 |
| 1,548,460 | Harrigan | Aug. 4, 1925 |
| 1,559,462 | Ryan | Oct. 27, 1925 |
| 1,770,796 | Niles | July 15, 1930 |
| 1,979,607 | Diehl | Nov. 6, 1934 |
| 1,992,910 | De la Mater | Feb. 26, 1935 |
| 2,023,533 | Lilly | Dec. 10, 1935 |
| 2,208,074 | Holz | July 16, 1940 |
| 2,308,753 | Hart | Jan. 19, 1943 |

FOREIGN PATENTS

| Number | Country | Date |
|---|---|---|
| 206,493 | Great Britain | 1925 |